United States Patent
Schulte et al.

(10) Patent No.: US 7,685,571 B2
(45) Date of Patent: Mar. 23, 2010

(54) INTERACTIVE DOMAIN CONFIGURATION

(75) Inventors: Wolfram Schulte, Bellevue, WA (US); Wolfgang Grieskamp, Redmond, WA (US); Nikolai Tillmann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 804 days.

(21) Appl. No.: 10/650,238

(22) Filed: Aug. 27, 2003

(65) Prior Publication Data

US 2005/0050519 A1    Mar. 3, 2005

(51) Int. Cl.
*G06F 9/44* (2006.01)

(52) U.S. Cl. .................................................. 717/126

(58) Field of Classification Search ................ 717/101, 717/104, 107, 114, 115, 116, 126, 112; 707/103 R, 707/10, 1, 6, 104.1; 709/226, 203, 219; 719/315–316, 719/328; 715/536, 513; 379/201.12, 221.07
See application file for complete search history.

(56) References Cited

U.S. PATENT DOCUMENTS

| | | | |
|---|---|---|---|
| 5,771,474 A | 6/1998 | Matt et al. | |
| 5,781,720 A | 7/1998 | Parker et al. | |
| 6,083,276 A * | 7/2000 | Davidson et al. | 717/107 |
| 6,237,135 B1 * | 5/2001 | Timbol | 717/107 |
| 6,704,804 B1 * | 3/2004 | Wilson et al. | 719/315 |
| 6,983,448 B2 * | 1/2006 | Hertel et al. | 717/116 |
| 7,222,333 B1 * | 5/2007 | Mor et al. | 717/115 |
| 2003/0126136 A1 * | 7/2003 | Omoigui | 707/10 |
| 2005/0050391 A1 | 3/2005 | Grieskamp et al. | |
| 2005/0114771 A1 * | 5/2005 | Piehler et al. | 715/536 |
| 2005/0120276 A1 | 6/2005 | Kolawa et al. | |
| 2006/0179383 A1 | 8/2006 | Blass et al. | |

OTHER PUBLICATIONS

Kahan et al., Annotea: "A Open RDF Infrastructure for Shared Web Annotations", May 2001, ACM 1-58113-348, pp. 623-632.*
Hunter et al., "Combining RDF and XML Schemas to Enhance Interoperability between Metadata Application Profiles", ACM 1-58113-348, May 2001, pp. 457-466.*
"Class Introspector", Java 2 Platform, Sun Microsystems ed. ver. 1.4.0, Copyright 1993-2002 pp. 1-6.*
Darko Marinov, Sarfraz Khurshid, "Generating Finite State Machines from Abstract State Machines", *ACM*, Jul. 2002, vol. 27, issue 4, pp. 112-122.

(Continued)

*Primary Examiner*—Tuan Anh Vu
(74) *Attorney, Agent, or Firm*—Klarquist Sparkman LLP

(57) ABSTRACT

Described herein are methods and systems for interactively configuring and producing a data domain for various data structure elements of a computer program. A domain configuration manager is described which interactively receives domain configuration information corresponding to a data structure element, reads a reflection of the program and produces a data domain according to domain configuration information. The domain configuration manager is capable of producing a data domain for a data structure element according to such domain configuration information such as an explicit expression, inheritance or domain generation technique. The reflection of the computer program exposes the methods and functions of the program to be used in the explicit expression regardless of the visibility rules. Also, predicates and conditions can be used with domain generation techniques to further narrowly configure the data domains.

7 Claims, 13 Drawing Sheets

OTHER PUBLICATIONS

Chandrasekhar Boyapati, Sarfraz Khurshid, and Darko Marinov, "Korat Automated Testing Based on Java Predicates", *ACM*, Jul. 2002, vol. 27, Issue 4, pp. 123-133.

Darko Marinov and Sarfraz Khurshid, "TestEra: A Novel Framework for Automated Testing of Java Programs", Nov. 2001, Proceedings of the 16th IEEE International Conference on Automated Software Engineering.

Wolfgang Grieskamp, Yuri Gurevich, Wolfram Schulte, and Margus Veanes, "Generating Finite State Machines from Abstract State Machines", *ACM*, Jul. 2002, vol. 27, issue 4, pp. 112-122, (2002).

Börger et al., "A Mathematical Definition of Full Prolog," In Science of Computer Programming, vol. 24, 35 pages, 1994.

Börger et al., "Correctness of compiling Occam to Transputer code," Computer Journal, vol. 36, No. 5, 43 pages, 1993.

Gaul et al., "Practical Construction of Correct Compiler Implementations by Runtime Result Verification," In Proceedings of SCI'2000, International Conference on Information Systems Analysis and Synthesis, 6 pages, 2000.

Goodenough, "Ada Compiler Validation: An Example of Software Testing Theory and Practice," In A.N. Haberman and U. Montinari, editors, System Development and Ada, vol. 275 of Lecture Notes in Computer Science, pp. 195-232, Springer-Verlag,. 1986.

Gurevich, "Evolving Algebras 1993: Lipari Guide," In Egon Boerger, editor, Specification and Validation Methods, Oxford Press, 26 pages, 1995.

Le Métayer et al., "Verification by Testing for Recursive Program Schemes," In LOPSTR'99 (International Workshop on Logic Program Synthesis and Transformation), Lecture Notes in Computer Science, 18 pages, Springer, 1999.

Muchnick, "Advanced Compiler Design and Implementation," Chapter 2, Morgan Kaufmann, San Francisco, 26 pages, 2000.

Pnueli et al., "The Code Validation Tool (CVT)," Software Tools for Technology, 10 pages, 1999.

"TinyLanguage, a Tutorial on generating test cases using Access Driven Filtering (ADF)," white paper, 19 pages, undated.

Wasserman et al., "Software Reliability via Run-Time Result-Checking," Journal of the ACM, 44(6):826-849, 24 pages, 1997.

\* cited by examiner

```
[ProfilerHint(FieldReadProfileable=true)]
abstract structure Exp
  case Const             910
    val as Integer       911
  case Bin               920
    op as Op             921
    left as Exp          922
    right as Exp         923
  case Let               930
    name as Name         931
    def as Exp           932
    body as Exp          933
  case Var               940
    name as Name         941 enum Op
  Add                    ← 950
  Sub type Name = String       ← 960
```

INTERACTIVE DOMAIN CONFIGURATION

TECHNICAL FIELD

The technical field relates to methods and systems for testing and verification of computer programs. More particularly, the field relates to configuring finite data domains to be used for testing and verification of computer programs.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyrights rights whatsoever.

BACKGROUND

Reliability is of key importance to success of any software in the market. Users are easily deterred by a faulty software program. Thus, software developers expend significant amount resources to ensure their software is reliable. However, continued pressure on software developers to shorten software development cycles has placed on them an increased demand for making the process of software testing and verification more accurate and less time consuming. Furthermore, costs related to testing and verification has grown to represent a significant portion (50% by some estimates) of the overall cost of developing a piece of software. Thus, automation tools for testing and verification have grown to be more and more sophisticated over time.

One aspect of testing and verification of software (regardless of the type of automation) that is particularly challenging is the ability of a testing tool to define a finite domain of data to be used in the testing. For instance, if a program accepts as one of its data inputs the basic data type of Integer that would mean that for a testing tool to exhaustively test the software it would have to conduct the test by applying virtually an infinite number of different integers. However, that is not only costly and time consuming but it also may be meaningless. Thus, a tester may look to the data members or variables of a program such as its various fields or parameters of the type Integer and manually limit the domain of each such data member to a selected set of values. For instance, if Age is a field of the type Integer then a meaningful domain for such a data member may be limited to integers ranging from 1-100. Such finitization is applicable to virtually any type of data. Thus, the process of testing can be vastly improved by specifying, or configuring the domain of the various data structure elements related to software programs.

However, manually identifying the various elements of a program and the data types they use and manually configuring their domains can be time consuming, if not impossible. Thus, there is a need to automate the process of identifying the various data structure elements of a program and configuring their domains to generate a meaningful set of data for testing and verification.

Furthermore, programs generally don't use data devoid of any context or relationship to other data. For example, most programming languages allow for defining data types and these data type definitions may be further used in defining particular data members such as data fields, and parameters of a program. For instance, if Age is defined in a program as a data of the type integer and Weight is also defined as the data type of Integer then Age and Weight are related through the fact that they are of the same type (Integer). Such relationships may be relied on to configure the domain of the data fields such as Age and Weight. For instance, the configuration of the domain for both Age and Weight may be the result of configuring the domain of their type the Integer. However, in a program of any meaningful size there may be literally thousands, if not more, such relationships and these relationships may also be more complex than the simple example provided above. To keep abreast of such relationships when manually configuring the domains may be nearly impossible. Thus, there is a need for methods and systems that automate the process of configuring data domains of a program by relying on the relationships between the various data.

SUMMARY

Described herein are methods and system for interactively configuring and producing data domains for various data structure elements of a computer program. In one aspect, domain configuration information is received by a domain configuration manager, which domain configuration manager reads a reflection of the computer program and produces data domains for the data structure elements according to the configuration information. The domain configuration information may be provided by a user through a graphical user interface or read from a stored location.

In one aspect, the domain configuration manager may indicate that the data domains to be produced are given by explicitly specified expressions which yield a result appropriately typed for the data structure element. The expression may use methods and functions of the computer program itself, which may be unconditionally exposed through the program's reflection regardless of the visibility rules.

In yet another aspect, the domain configuration information may indicate that the data domain for a selected data structure element is to be inherited form the data domains of related data structure elements. For example, the data domain for a field or a parameter may be inherited from the domain of its type. Also, the data domain for a data type may be inherited from the data types of its sub-types, if any, or any other compatible types. In such an inheritance model the data domain manager produces the data domain for the data type as a union of the data domains of its sub-types, or some other compatible types.

In a further aspect, the data domain manager may receive configuration information indicating that the data domains for selected data structure elements of a program are to be produced by applying domain generation techniques to selected data domains of other data structure elements. The domain generation techniques may be mathematical operations such as a Cartesian product of selected data domains. Furthermore, the domain generation techniques may include the application of predicates or conditions to results of operations on selected data domains. For instance, the data domain for a data type may be a Cartesian product of the data domains of selected ones of its fields and the members of the resulting data domain may be further filtered by the use of a predicate. The same may apply to a method whereby the data domain for the method may be generated by the domain configuration manager by using the data domains of its parameters.

In a further aspect, the domain configuration information may be received by the domain configuration manager via a graphical user interface, which may be part of or separate from the domain configuration manager.

DETAILED DESCRIPTION

Exemplary Data Structure Elements of a Programming Language

Figure 1:
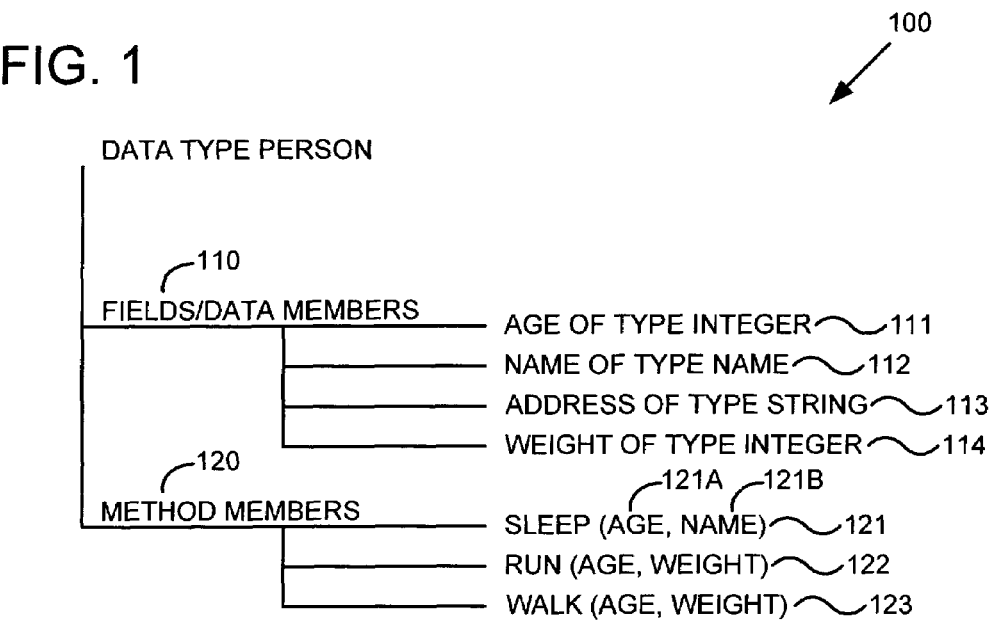
FIG. 1 is a tree diagram illustrating a definition of the data type of Person and its component elements.

One of the primary tasks of a program may include manipulating data to yield a result. The same may be said of various sub-components of a program that receive input data from and provide results to other sub-components of a program. Thus, it is common for programming languages (e.g., C++, Java, C#, C, FORTRAN etc.) to provide for language constructs for defining data structure elements that may comprise data and functions to be performed using the data. In object oriented languages (e.g., Java, C++, C# etc.) such data structure elements may comprise a data type and its component elements (e.g., fields, parameters, methods, etc.). In an object-oriented language a new data type may be created by declaring a class. Based on the class declarations, objects of the class may be instantiated which may then be used to access data and the functions related to the object. FIG. 1 illustrates one such data type definition for a data type of Person. Here, the data of type Person 100 may be used as a variable in various functions to be performed by the program. In general, the terms data types and class may be used interchangeably. Thus, in this example the class definition of a Person class is an abstract description of what a person is but when an object of the class Person is instantiated then the object represents an actual person, which can be manipulated by the program.

The data type Person 100 may comprise several data members 110, which describe the data associated with describing an object of that data type and may also include method members 120 which describe the functions that may be performed by an object of that data type. Data members may also be referred to as fields or data fields and methods may also be referred to as functions. In case of the data type Person, the data members comprise the fields of Age 111, Name 112, Address 113 and Weight 114. As noted in FIG. 1, each of the fields themselves is of a certain data type. For example, the fields Age 111 and Weight 114 are of the type Integer, the field Name 112 is of the type Name and the field Address 113 is of the type String. Type Integer and String are typically referred to as atomic types or basic types and they are usually predefined in the type system of most languages. However, fields do not have to comprise such atomic types. Instead, user-defined types may be used as well. For example, type Name is a user defined type. Also, the data type Person itself is a user-defined type and selected fields of other data types may comprise Person data types. Furthermore, recursive data types are also possible whereby certain data types have fields of the same data types as themselves. For instance, it is possible to recursively define a data-type of Person to have a field of the type Person.

Besides data members 110 data type or class definitions may also comprise method members 120. For example, the Person data type 100 comprises Sleep method 121, Run method 122 and Walk method 123. Methods may take one or more parameters which are variables and typically defined as the fields of the data type within which the method is recited. Parameters do not have to be variables (they can be constants instead) and some methods may never need any parameters. For example, the Sleep method 121 has associated with it the parameters Age 121A and Name 121B. Similarly, the Run method 122 and the Walk method 123 have as parameters Age and Weight. In this example, the parameters associated with the methods of the exemplary data type are fields or data members of the same data type. However, this is not necessary for all data types because it is possible for a method to use as its parameters data members of a data type other than the one to which the method itself belongs. Also, not all data members of a data type definition are necessarily parameters for a method. Some data members may simply serve a data storage function. Also, the data type defined as shown in FIG. 1 has been defined with methods. However, it is possible that certain data type may simply comprise data members and no method members.

FIG. 1 serves merely as an illustration of how data structure elements may be defined for program. Data structure elements generally include data types, fields, methods, functions and parameters. Various languages of course will have different language constructs to define data structure elements such as data types or classes, to define fields, to define methods or functions and their respective parameters.

Exemplary Data Domains Related to Data Structure Elements

Figure 2:
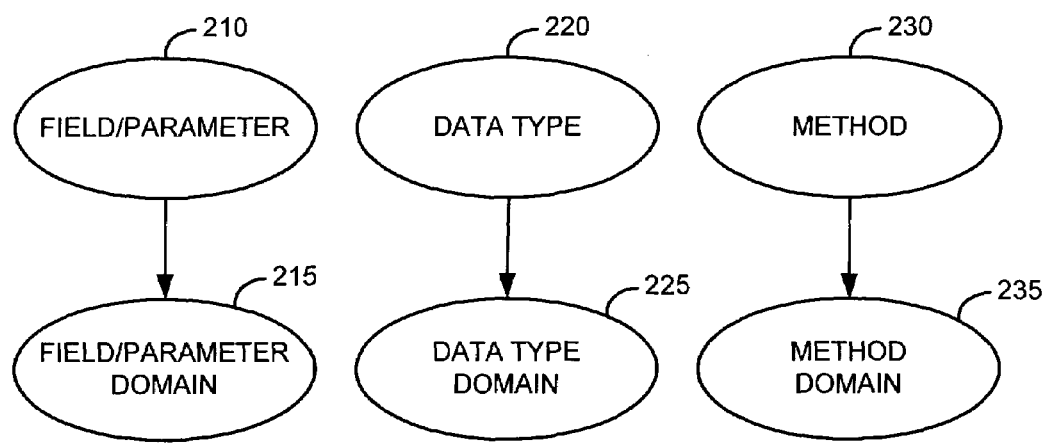
FIG. 2 is a block diagram illustrating the relationship between various data structure elements and their corresponding data domains.
Figure 3A:
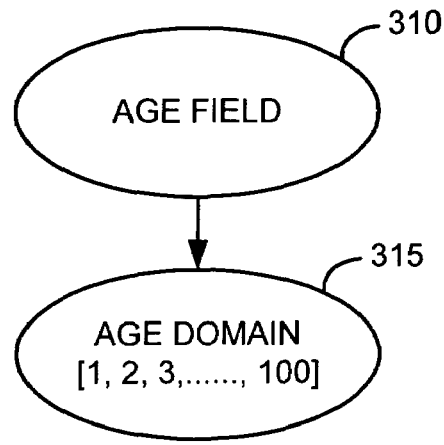
FIG. 3A is a block diagram illustrating a data domain for the Age field of the data type Person defined in FIG. 1.

It may be desirable to target the testing or verification of software by selecting or limiting the domain of data values to be used in the testing or verification process. For example, in a software program that may use the Person data type 100 defined in FIG. 1 it may be desirable to limit the domain of data values of the Age field 111 to a range between 1-100 because human beings rarely live beyond 100 years of age and testing the software using Age values beyond 100 years may be meaningless. Such limitations on the data domains may be applicable to other program components such as methods, functions, parameters and types. FIG. 2 illustrates one approach to limiting the data domains of a software program. Fields and parameters 210 may each have a corresponding domain of values 215. In case of fields or parameters the domain would be an enumeration of values that the field or parameter may be limited to. For example, as shown in FIG. 3A, the Age field 310 may have a domain 315 which is an enumeration of Age values of 1 through 100. Similarly, the data domain for an individual parameter may be an enumeration of its possible set of values. For example, the variable of Age 111 field serves as the parameter for the Sleep method 121. Therefore, the domain of the parameter Age 121A may be the same as that of the Age field 111. Thus, the data domain of a field may serve to define the data domain of a parameter that corresponds to the field.

Figure 3B:
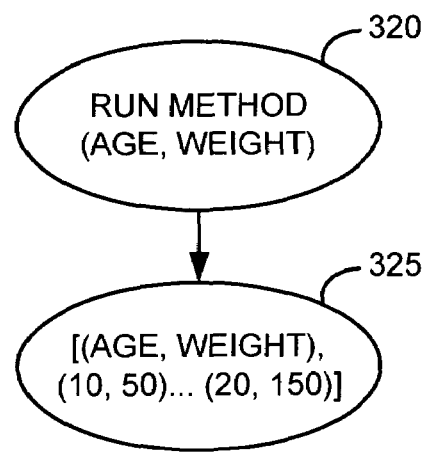
FIG. 3B is a block diagram illustrating a data domain for the Run method of the data type Person defined in FIG. 1.
Figure 3C:
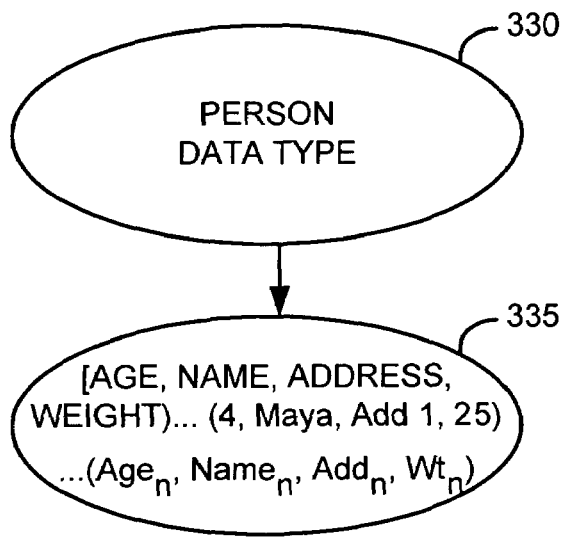
FIG. 3C is a block diagram illustrating a data domain for the data type Person defined in FIG. 1.

Referring back to FIG. 2, each method such as the one at 230 may have a related data domain 235. In the case of methods the domain may be an enumeration of a set of tuples of its parameters. A set of tuples is a collection of values for a set of variables. For example, a one member tuple is represented as $(a_1)$, an ordered pair is a two member tuple represented as $(a_1, a_2)$, a three member tuple is represented as $(a_1, a_2, a_3)$ and so on. FIG. 3B illustrates a data domain 325 for the method Run 320 (defined in FIG. 1), which receives the parameters of Age and Weight. Thus, the data domain for the Run method 122 is a set of two member tuples of various combinations of values of Age and Weight. For example, these tuples may be as follows:

(Age, Weight)=[(10,50), (12,55), (45, 167) ... (20, 150)]

Thus, the tuples of parameters of a method as shown above may be limited by the data domains of its components. For example, the tuple sets for (Age, Weight) may be limited by the data domains defined for the Age and Weight parameters or they may even be defined more narrowly. As noted above, the Age parameter may be limited to an enumerated set of integer numbers between 1 and 100. Thus, the tuples of (Age, Weight) may be limited to Age values of integers between 1 and 100. The same limitation may be applied to the parameter Weight.

Referring again to FIG. 2, each data type 220 may also have a data domain 225 associated with it. The data domain for a data type is a simple enumeration of the possible values of the data type. For example, in case of a basic type like Integer the domain may be a set of integer values for the Integer type to be used in the program. In this case, the domain may be represented as follows:

[1, 2, 3, 4, 5, ... 100]

A more complex data type may have multiple fields for defining its value, in such a case, the data domain of a data type may be tuples comprising possible values of its fields. For instance, for a Person data type 330, the values may comprise tuples of its fields [Age, Name, Address, Weight] at 335. Thus, an example of such a domain may be represented as follows:

(Age, Name, Weight, Address)=[(4, Maya, 25, Address 1), ... (25, Jason, 135, Address 2)]

Exemplary Domain Configuration Manager

Figure 4:
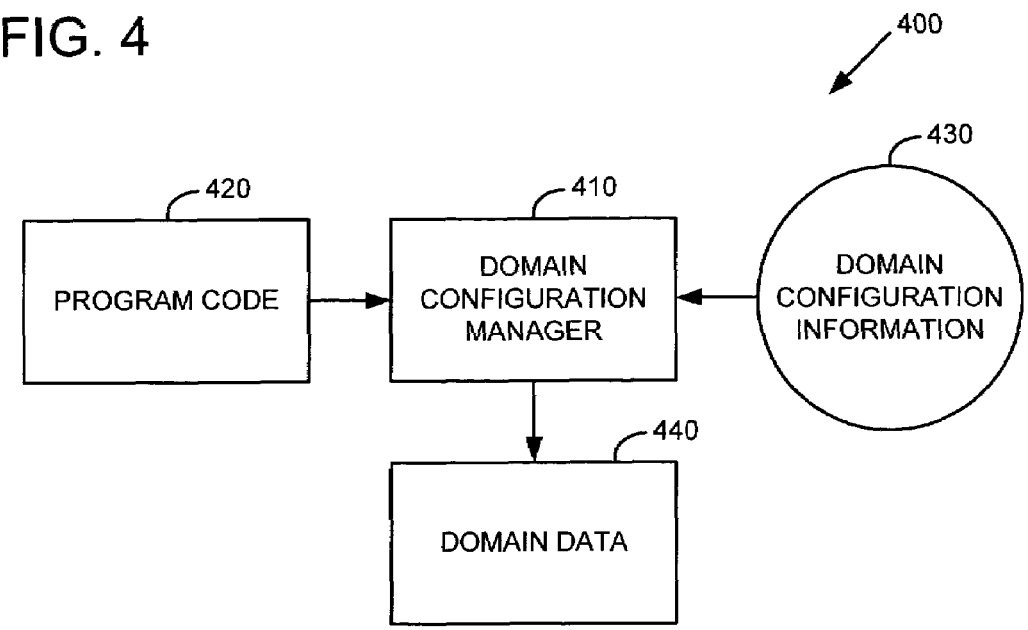
FIG. 4 is a block diagram that illustrates a system for configuring the data domains of various data structure elements of a computer program.

As described above, configuring the data domains for various elements of data structures of a program limiting them to selected sets of meaningful data can help improve targeted testing and verification of programs. However, configuring numerous such data domains manually can be a daunting task due to the sheer number of data structure elements of computer programs. FIG. 4 illustrates a system 400 for configuring the data domains of the various data structure elements (e.g., data types, fields, structures, parameters, methods etc.) of a computer program. As shown in FIG. 4, the system 400 includes a domain configuration manager 410 which reads a reflection of the computer program 420 whose data domain is selected for configuration and domain configuration information 430 which comprises information related to instructions for configuring the data domain. Based on the inputs of the reflection of the computer program 420 and the configuration information 430 the domain configuration manager 410 produces the appropriate domain data 440.

Figure 5:
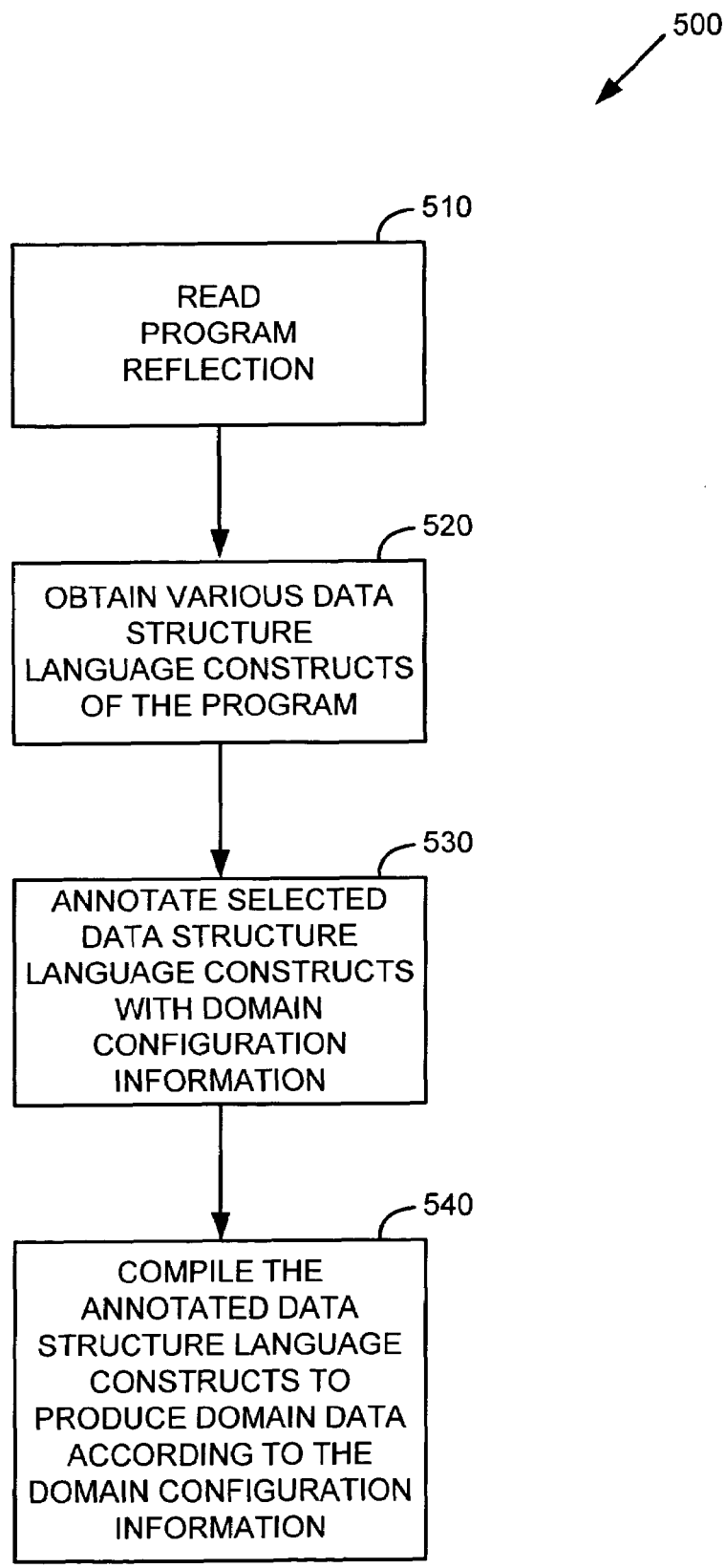
FIG. 5 is a flow chart that describes a method for producing data domains for data structure elements of a computer program by annotating data structure language constructs of the program with domain configuration information.

FIG. 5 illustrates a method 500 for using the domain configuration manager 410 to produce a data domain 440 for a computer program. At 510, the domain configuration manager 410 reads a reflection related to the computer program whose data domain is being configured. The reflection of a computer program in part comprises the meta data related to the data structure elements used in the program. For example, by reading a program reflection the domain configuration manager may be able obtain data structure information such as the description of all the various data types, fields, methods and their parameters within a computer program. Developer tools currently available provide for features whereby the reflection of a computer programs can be read to obtain the information related to the data structure elements employed in the programs. For example, .NET framework by Microsoft® Corporation supports features for allowing an executing program to introspect upon itself to obtain information (meta data) related to its classes or data types, fields, methods, parameters etc. The Java® programming language by Sun® Microsystems allows for similar features. Older programming languages such C, FORTRAN, and even C++ do not have such features. However, some such languages are supported by the .NET® framework (e.g., C, C++, FOR-TRAN etc.) and once compiled within the context of the .NET® framework these same reflection features may be used to obtain the reflection of programs coded in all the .NET® supported languages. Methods other than those described with respect to Java® and the .NET framework may be used as well.

Once the reflection of a computer program is read at 510, the programming language constructs related to the data structures described in the reflection may be obtained at 520 by the domain configuration manager 410. Then at 530, the data configuration manager 410 may be used to annotate such data structure language constructs with information related to domain configuration 430. Such an annotated data structure language construct may then be compiled at 540 along with the domain configuration 430 to produce the desired data domain 440 for the various data structure elements of a program.

Exemplary Domain Configuration Information

Figure 6:
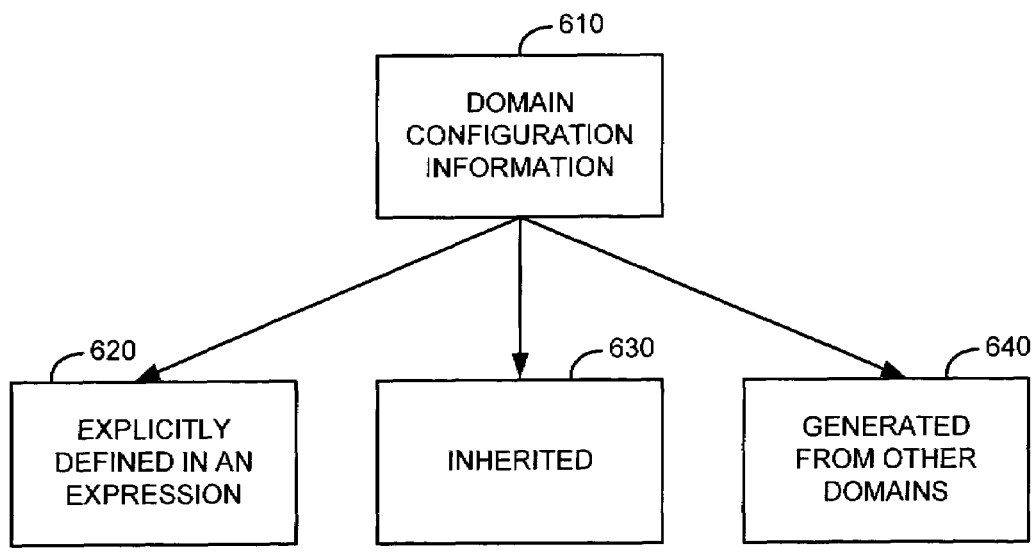
FIG. 6 is a block diagram illustrating exemplary forms of domain configuration information.

The domain configuration 430 in general comprises any information that may be used to indicate to a domain configuration manager 410, the desired data domains for various data structures of a computer program. Through annotation, the domain configuration manager 410 associates such a specification to selected data structure language constructs to be used for producing the desired data domain 440. For instance, as shown in FIG. 6, a tester may want to indicate the domain configuration 610 for various data structure elements (e.g., data types, fields, functions or methods, parameters etc.). In order to do so, the desired domain configuration 610 may be explicitly defined or expressed in the form of some mathematical or language expression 620. The data domain of selected data structure elements may also be configured as inheriting from the data domains of other related data structure elements 630. Also, the data domain configuration 610 of selected data structure elements may be indicated as being generated as a result of an operation on other data domains 640.

The domain configuration 430 may be interactively entered via a user interface of the domain configuration manager 410. Alternatively, such information may be read from a file accessible to the domain configuration manager 410 and may have been the result of computation related to other computer programs.

Exemplary Domain Configuration in Form of Expressions

One way of indicating domain configuration information is in form of an expression. The expression may be a programmatic expression or in other words a combination of language constructs of a chosen programming language (e.g., C, C++, Java, C# etc.). The expression can take any form or be in any programming language but the expression should result in a set of values that suitably expresses the data domain of the selected data structure element. For a data type, an expression configuring its domain should denote an enumeration of values of this type. Which means, for basic or atomic types it may be as simple as an enumeration of possible values of this type (e.g., for an Integer data type the result of an expression configuring its data type may be [1, 2, 3 . . . 100]). For a complex data type it may be a set of values of its fields (e.g., for a Person data type the results may be [(5, Maya, 25, Add 1) . . . (Age$_n$, Name$_n$, Wt$_n$, Address$_n$)]. For a method or function the expression should denote tuples of various values of its parameters (e.g., for the Run method of FIG. 1, which uses the (Age, Wt) parameters, it may be a set of tuples such as [(5, 25), . . . (25, 135)]. For fields and parameters the result of an explicit expression configuring their domain should result in a set of values of the type the fields and parameters belong to. For example, an expression configuring the domain of the Age field should yield a result of integers such as [1, 12, 15, 89, . . . 100].

Although the expressions may be provided in any programming, or modeling language, the Abstract State Machine Language (ASML) is particularly well suited for denoting set comprehensions, which are useful for constructing data domains such as the examples provided above. For instance, the following expression in ASML finds a set of number pairs:

$$\{(i, j)|A=\{1 \ldots 5\}, i \text{ in } A \text{ where } i<4, j \text{ in } A \text{ where } j<i\}$$

Here, the expression describes a set of number pairs where the first number in the pair is a member of the set A and is less than 4, while the second number in the pair is also a member of the set of A and is less than the first number. The result of the expression above where the set A is defined to be $\{1 \ldots 5\}$ is as follows:

$$\{(2, 1), (3, 1), (3, 2)\}$$

Any functions or mathematical operations that could yield a domain of proper form corresponding to the data structure may be used in the expression. Furthermore, the reflection of the program being annotated 420 may provide access to the methods and functions defined in the program, which can be used within an expression to specify its own data domain. For example, if a program has been compiled using the tools of the .NET® framework, upon reading a reflection of such a program the domain configuration manager 410 should have access to all the methods of the .NET® framework libraries and these methods can be used in the expression for configuring the data domain of the program for its testing or verification. The same may be applicable to the reflection of a Java® program. Furthermore, through the reflection all the methods of all of the data types of a program may be made available to be used in an expression for configuring the domain of any data structure element of the program regardless of the visibility rules applicable to the various methods. For example, in a program if a data type is defined with a class declaration including several methods that have their visibility rules set to "Private", normally such methods would not be accessible outside of the class declaration itself. However, a data domain configuration manager 410 reading a reflection of the program 420 can have access to such methods and thus, these methods may be used as part of any explicit expression to configure the data domain of the program itself. However, when specifying a data domain through explicit expression such as the one described above one cannot use data domains of other data structure elements.

Exemplary Domain Configuration Information in Form of Inheritance

Data structure elements of a program may be related to each other in various forms. For example data types may comprise one or more sub-types. Also, data types may have one or more fields, or parameters of that data type declared within a program. Thus, it is possible for the domain configuration information 610 to indicate that data domains of some data structure elements are inherited from the data domains of other related data structure elements. Providing such domain configuration information 430 for properly configuring the data domains requires a lot less effort on part of a user when compared to manually entering the data domain or even producing a data domain by processing an expression.

Figure 7A:
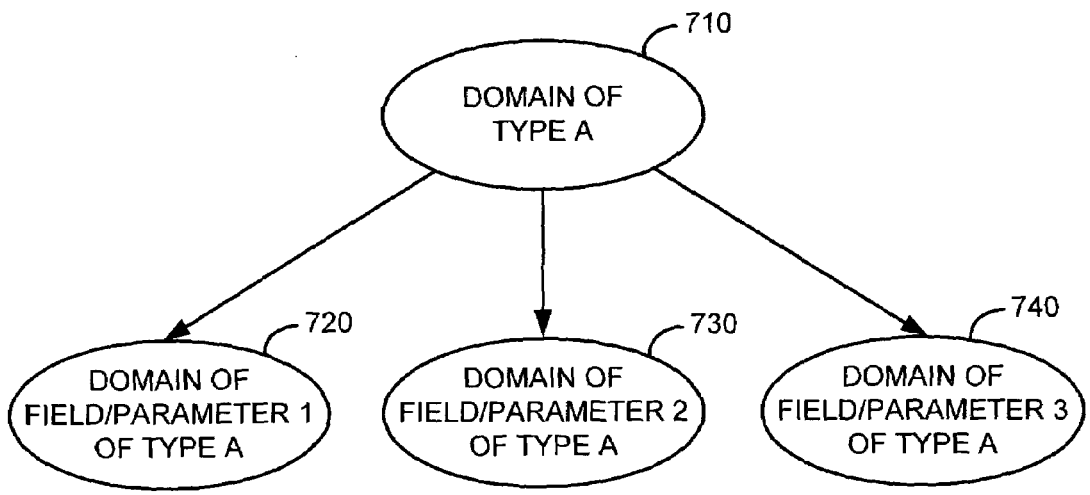
FIG. 7A is a block diagram illustrating a method for configuring the data domain for a field or a parameter to inherit the data domain specified for their data type.

FIG. 7A illustrates one form of data domain configuration information, wherein the data domains of fields or parameters of the data type 'A' (e.g., 720, 730 and 740) are indicated as being inherited from the data domain of the type 'A' 710. For instance, the data type Person 100 of FIG. 1 has a field, Age 111, which is of the data type Integer, thus, the inheritance method of FIG. 7A would allow the data domain of the Age field 111 to be inherited from the data domain specified for the type Integer. Thus, if the data type Integer is specified to have a domain of [1, 2, 3 . . . 100] then the data domain of the field Age 111 can be configured to inherit from its type Integer by providing such an instruction in the domain configuration information at 430. Similarly, the data domain of the Weight field 114 of the data type Person may also be configured to be inherited from the data domain of its type, which is Integer.

Although, the previous example referred primarily to fields a similar inheritance model is entirely applicable to parameters. Thus, the data domains for parameters too can be configured to inherit from their types. However, once the data domain of a field is configured, it may not be necessary to configure the data domain of parameters that correspond to this field. For instance, configuring the data domain for the Age field 111 may be sufficient to configure the data domain for the corresponding Age parameter 121A. On the other hand, it is also possible to configure the data domain of the Age parameter 121A separately from the Age field 111. In this instance, the data domain for the Age parameter 121A can be configured to be a subset of the data domain for the Age field 111.

Figure 7B:
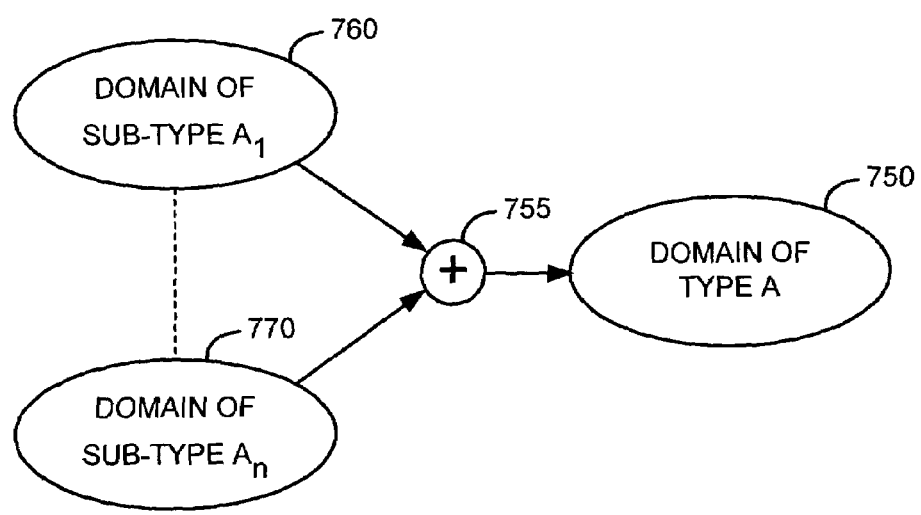
FIG. 7B is a block diagram illustrating a method for configuring the data domain of a data type to be inherited from a union of other compatible data domains.

Besides fields and parameters inheriting their data domains from the data domains of their types other data domains may be inherited by other methods. For example, as shown in FIG. 7B, data types may comprise sub-types and such a data type may inherit its data domain 750 by a union 755 of the data domains 760 and 770 of its sub-types or some other compatible domains. For instance, a data type Name may comprise sub-types of Male Name and Female Name. Thus, the data domain for Name type may be a union of its sub-types Male Name and Female Name. For example, if the domain for Female Name sub-type is [Anna, Maya] and the data domain for the Male Name sub-type is [Christian, Wolfgang] then the data domain of the Name type by union of its sub-types is [Anna, Maya, Christian, Wolfgang]. Such inheritance is possible even if domains forming a union are not domains of sub-types so long as the domains are compatible in form of the data they comprise. Domain configuration information 430 related to inheritance may include an instruction that a data domain of a selected data structure element is to be inherited and an indication of the one or more data domains it is to inherit from.

Figure 8A:
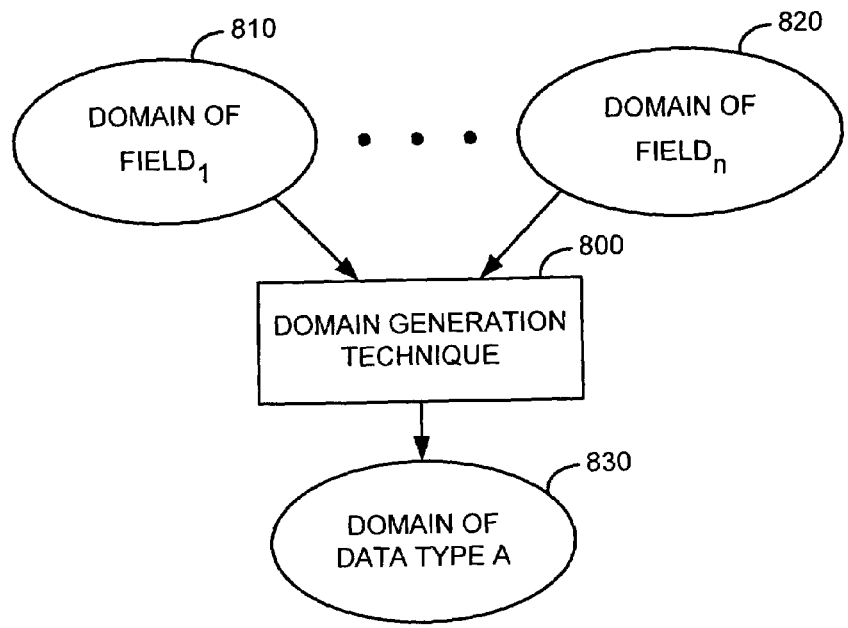
FIG. 8A is a block diagram illustrating a method of configuring the data domain of a data type to be produced by applying a domain generation technique to the fields defined for the data type.
Figure 8B:
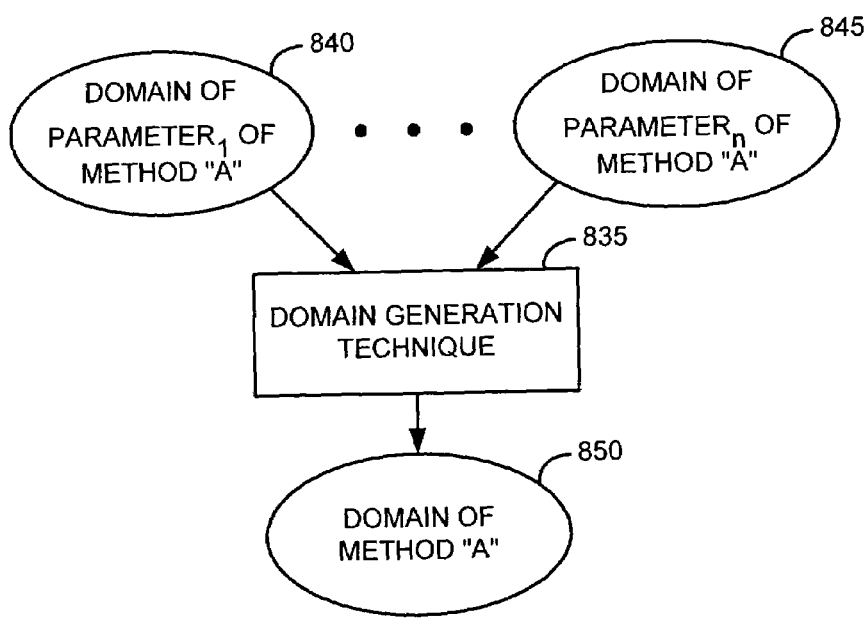
FIG. 8B is a block diagram illustrating a method of configuring the data domain of a method to be produced by applying a domain generation technique to the parameters of the method.

Exemplary Domain Configuration Information in Form of Instructions to Use Domain Generation Techniques to Produce Domains from Other Data Domains by Performing Operation on Such Domains Besides an explicit expression or an inheritance specification domain configuration for data structure elements (e.g., methods, data types etc.) may comprise data domain generation techniques applied to other data domains for producing a desired data domain for selected data structure elements. For instance, in FIG. 8A domain generation techniques 800 may be applied to the data domains of the fields of data type A (e.g., 810 and 820) to generate the data domain for data type A 830. Similarly, in FIG. 8B domain generation techniques 835 may be applied to the data domains of the parameters of a method 'A' (e.g., 840 and 845) to generate the data domain of the method A 850.

Generation techniques may comprise any mathematical operations on data domains that yield a data domain of a suitable form. For instance, a generation technique for producing data domain for a method from the data domains of its parameters must yield a data domain in form of tuples of the possible values of the parameters. The generation techniques (800 and 835) are different than expressions for explicitly expressing data domains because, unlike the explicit expressions, the generation techniques may perform mathematical operations on other data domains for producing the desired data domain. Furthermore, by applying the generation technique a desired data domain may be generated from performing operations on data domains of data structure elements that are unrelated to each other and unrelated to the data structure element for which data domain is being generated. Domain generation techniques may be a simple case such as the applying a Cartesian product of the data domains of the parameters of a method to yield the data domain of the method. For instance, the data domain of the Run method 122 of FIG. 1 may be configured to be generated as a Cartesian product of the data domains of its parameters Age and Weight. Thus, if Age had a data domain of [5,10] and Weight had a data domain of [25,50] then the set of tuples resulting from the Cartesian product of the parameters Age and Weight would be as follows:

Run (Age, Weight) data domain={[5,25], [5,50], [10, 25], [10, 50]}

Although, the generation technique described above is a simple case more complex operations may be performed on selected data domains to produce the data domains for other data structure elements. For example, predicates may be specified such that the data domain for a data structure element (e.g., data types and their methods) comprises members that meet a specified predicate. For instance, parameters for a method AB may be 'a' of data type 'A' and 'b' of data type 'B'. Also, suppose the data domain for the parameter 'a' is Dom (A) and the data domain for the parameter 'b' is Dom(B). Then, the data domain for the method AB may be produced using the Cartesian product of the domains Dom(A) and Dom(B). Also, a predicate or pre-condition P(a,b) may be defined for data domain of the method such that only those members of the data domain generated as a result of the Cartesian product of Dom(A) and Dom(B) that also meet the predicate or condition are included in a data domain for the method AB. Such a definition may be expressed as follows:

Domain of method AB=[(a,b)|a in Dom(A), b in Dom (B) where P(a,b)}

Thus, the data domain for the method AB is a sub set of the domain resulting from the Cartesian product of Dom(A) and Dom(B) that meet a selected pre-condition or predicate P(a, b). The pre-condition or predicate can comprise any constraint on the members of a selected data domain. For instance, for data domain having members with values of Name type it might be a specified range of values for the beginning letter of a Name value. For members of Integer type the condition may be specified as a value higher than, lower than or equal to a given value. Of course, these generation techniques can be much more than a Cartesian product with a predicate and may involve more complex mathematical algorithms. Even the case where a domain is inherited by generating a union of compatible domains (e.g., FIG. 7B) may be thought of as a special case of applying a generation technique. Again, since the domain configuration tool 410 is capable of reading the program reflection 420 all the methods and functions of the program itself may be used to specify the generation techniques of 800 of FIG. 8A and 835 of FIG. 8B.

Figures 9, 10:
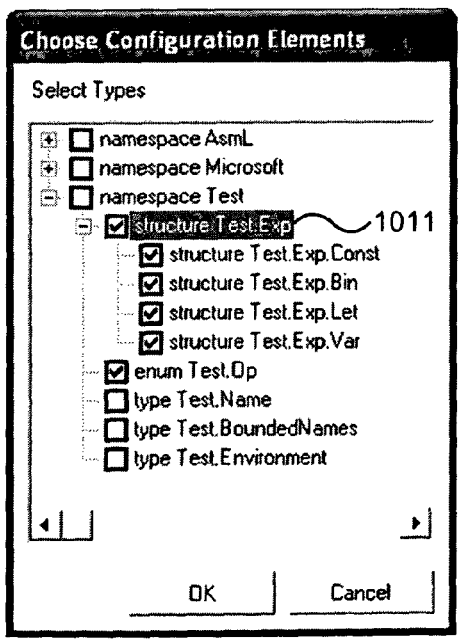
FIG. 9 is a listing of an exemplary definition for the data type of Exp (expression) along with its members.
FIG. 10 is a diagram of a graphical user interface element presenting various data structure elements of a program available for data domain configuration including the date type Exp of FIG. 9.

Exemplary Configuration of a Data Domain Using a Graphical User Interface to Provide Domain Configuration Information The configuration of the data domains for the data type Exp (FIG. 9) and its component elements (e.g., its methods and fields) with the use of a user interface to provide the domain configuration information 430 to the domain configuration manager 410 is described below with reference to FIGS. 9 through 16. FIG. 9 illustrates a definition of a data type of Exp (expression) 900. It is a abstract data type comprising several sub-types Const 910, Bin 920, Let 930, and Var 940. Each of the sub-types 910, 920, 930, and 940 have their own fields. The sub-type Const 910 has the field val 911 which is of the data type Integer. The sub-type Bin 920 comprises the fields op 921 of the data type Op, left 922 of the data type Exp, and right 923 of the data type Exp. The sub-type Let 930 comprises the fields name 931 of the data type Name, def 932 of the data type Exp and body 933 of the data type Exp. Lastly, the sub-type Var 940 has a single field of name 941 of the data type Name. The data types Op and Name are defined at 950 and 960 respectively. Since the fields of some of the sub-types of data type Exp are themselves of the data type Exp this data type is a recursive case. A data type definition such as the one at 900 may be provided in a program's code.

Figure 11:
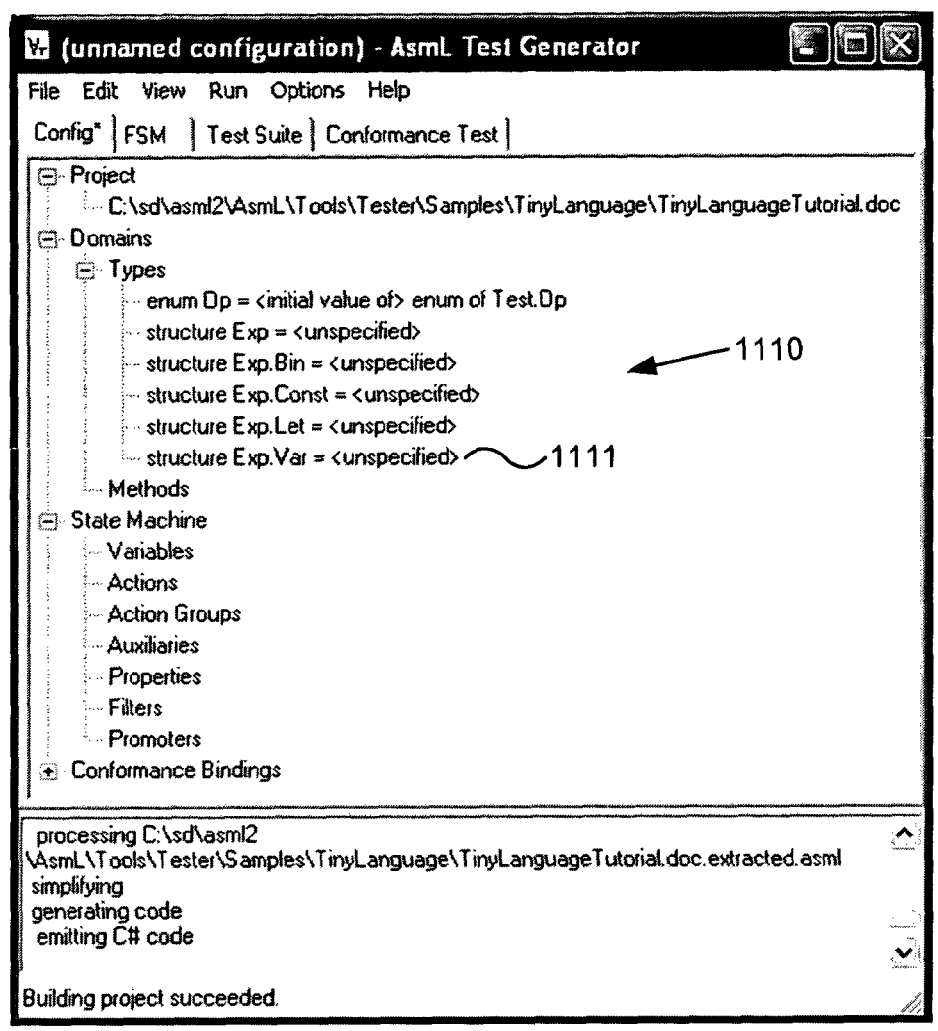
FIG. 11 is a diagram of a graphical user interface element illustrating a current state of data domain configuration of the various data structure elements listed in FIG. 10 prior to providing any domain configuration information.
Figure 12:
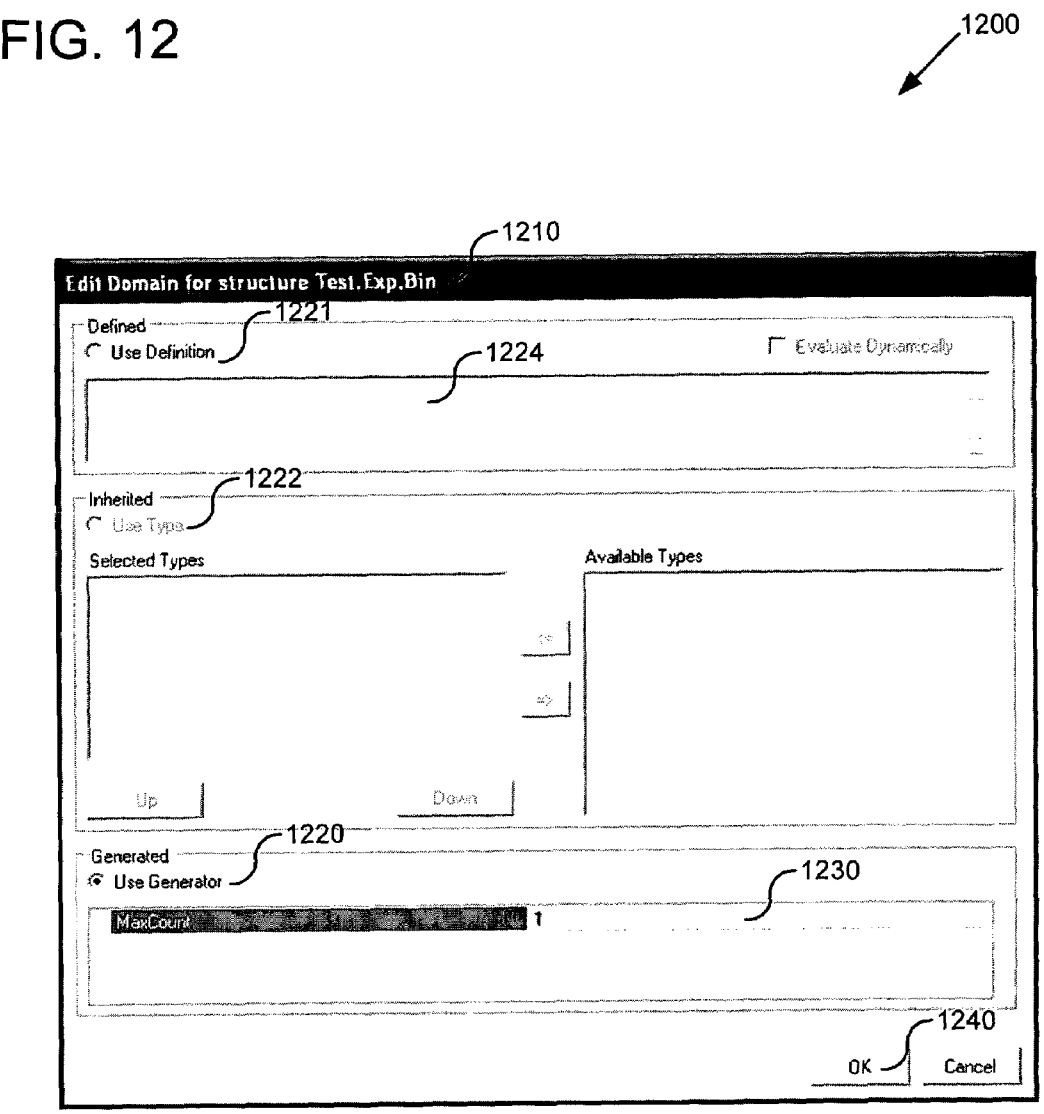
FIG. 12 is a diagram of a graphical user interface element for receiving user inputed domain configuration information indicating that for selected data structure elements listed in FIG. 10, the data domains are to be produced by applying domain generation techniques.
Figure 13:
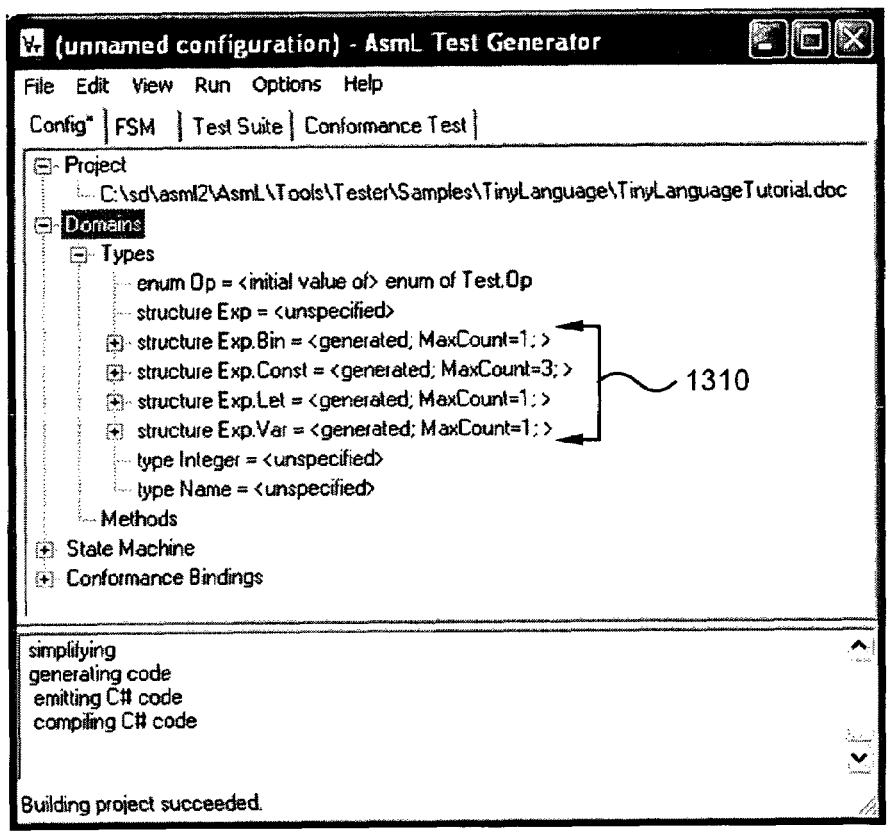
FIG. 13 is a diagram of a graphical user interface element indicating the current state of data domain configuration for selected data structure elements of FIG. 10 after receiving the user input indicating their domain is to be configured by applying domain generation techniques.

The domain configuration manager 410 reads a reflection of such program code 420 to generate a user interface element such as the one show in FIG. 10. As shown in FIG. 10, the user interface provides a list of data types, sub-types, methods, fields, parameters and other data structure elements available for configuring their data domains. Using the user interface, the data structure elements may be chosen for configuring their data domains. For instance the check box 1011 may be selected to choose to configure the data domain of the data type Exp. Likewise, other data structure elements may be selected. Once such a selection is made another user interface (FIG. 11) may be presented indicating the current domain configuration of data structure elements selected for domain configuration at 1110. In this case only the data type Exp 900 and its sub-types (910, 920, 930 and 940) have been selected for domain configuration. As shown in FIG. 11, none of the selected data structure elements have been configured. For example, at 1111 the data domain of sub-type Var is indicated as "unspecified." Thus, another user interface element such as 1200 in FIG. 12 may be used to specify the domain configuration information 430 to be used by the domain configuration manager 410 to produce a data domain 440 for the selected data structure elements. For instance, the user interface element 1200 indicates that it is receiving user input for configuring the data domain for the sub-type Bin 1210 and the user input at 1220 indicates that the data domain for the sub-type Bin is to be produced using domain generation techniques which may rely on other data domains. The selector window 1230 may be used to select various properties that may be associated with generation techniques. Besides the use of generation techniques other domain configuration information may be provided that is related to inheritance at 1222 and configuration information for explicitly specifying or defining data domains via expressions may be accomplished by selecting the "Use definition" button 1221 and then entering the expression in the text box 1224. However, in this case the FIG. 12 shows that the domain configuration information selected by the user relates to generation techniques. Once the domain configuration information is entered the 'OK' button 1240 may be selected. If the same is repeated for all the sub-types 910, 930, and 940 of the data type Exp 900 then the user interface element of FIG. 11 would be changed to appear as shown in FIG. 13. In FIG. 13, at 1310, the data domain of the sub-types Bin 920, Const 910, Let 930 and Var 940 are now indicated as being configured to be produced by the selected generation techniques.

Figure 14:
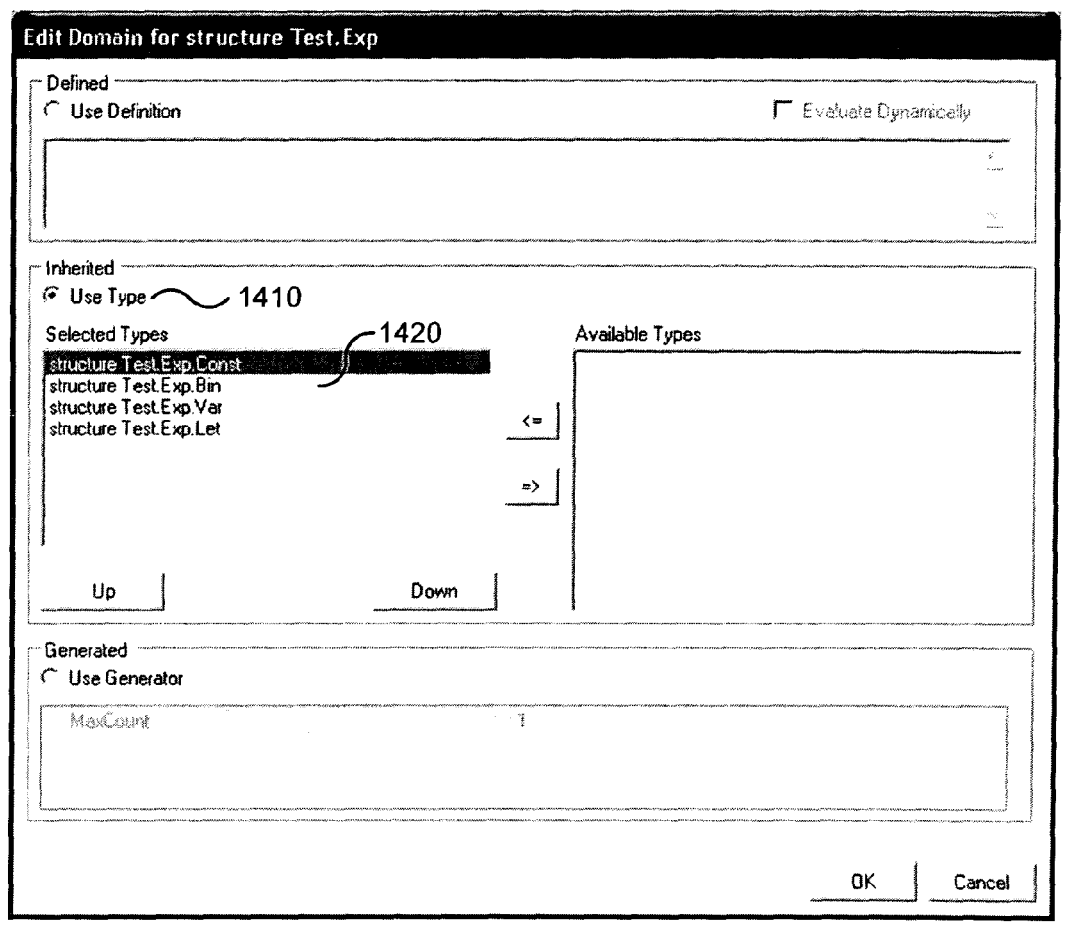
FIG. 14 is a diagram of a graphical user interface element for receiving user inputed domain configuration information indicating that the data domain for the data type Exp defined in FIG. 9 is to be inherited from its sub-types.
Figure 15:
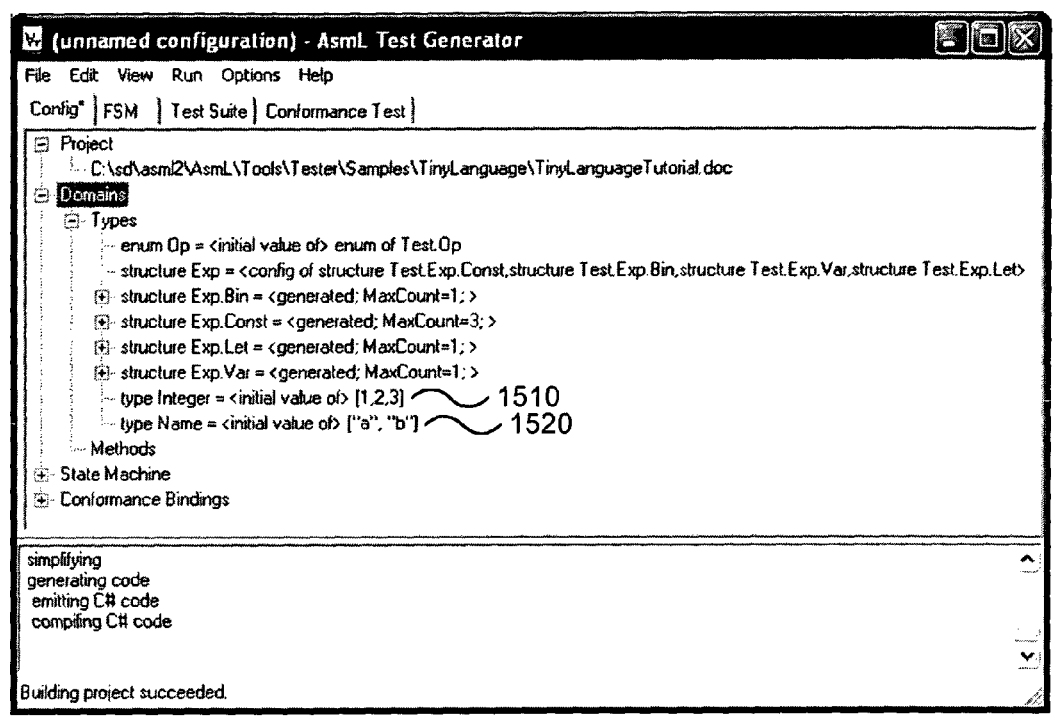
FIG. 15 is a diagram of a graphical user interface element indicating a current state of data domain configuration for selected data structure elements of FIG. 10 after the data domains for the atomic data types of Integer and Name have been expressly configured.

The data type Exp 900 is a complex data type comprising multiple sub-types Bin 920, Const 910, Let 930 and Var 940. Thus, there are no values as such for the data type Exp other than the values of the sub-types Bin 920, Const 910, Let 930 and Var 940. Therefore, the data domain for the data type Exp may be specified as being inherited from the data domains of its sub-types Bin 920, Const 910, Let 930 and Var 940. As shown in FIG. 14, the data domain for the type Exp 90 may be configured to be inherited from the data domain its sub-types by selecting the "Use Type" button 1410 and selecting the sub-types at 1420 to inherit from. Using such inheritance information the domain configuration manager 410 then produces a data domain for the data type Exp 900 which is a union of the data domains selected to be in the box 1420. Thus, not all the sub-types of a data type may be selected to produce a data domain for the data type through inheritance, and some other compatible domains may also be selected.

Besides configuring the data domains of the types whether they are data types or related sub-types the domains for the fields may be configured as well. For instance, the sub-types Const 910, Bin 920, Let 930 and Var 940 all have fields whose data domains need to be configured. The default may be that the fields inherit their data domains by assuming the data domains of their types. For instance, the field val at 911 can inherit the data domain of its type the Integer, the fields name at 931 and 941 may inherit from the domain of the Name type and the field op 921 from the domain of the Op type. The domain for the Op type is limited by the declaration at 950 to be limited to 'Add' and 'Sub'. However, the data domains for the Name and Integer types have not been configured. Thus, the data domains for the atomic types Name and Integer may be specified expressly by choosing the "Use definition" button 1221 and then entering an expression in the text box 1224. The expression can be any expression which enumerates a set of values whose elements are of the desired type. For Integers it has to be an enumeration of integers and for Name it has to be an enumeration of a set of strings. Using an expression to configure the data domain of atomic types Integer and Name may result in a domain configuration illustrated in FIG. 15. Here the data domain for the type Integer is configured expressly to be [1, 2, 3] at 1510 and the domain for the type Name is configured expressly to be [a, b] at 1520.

Figure 16:
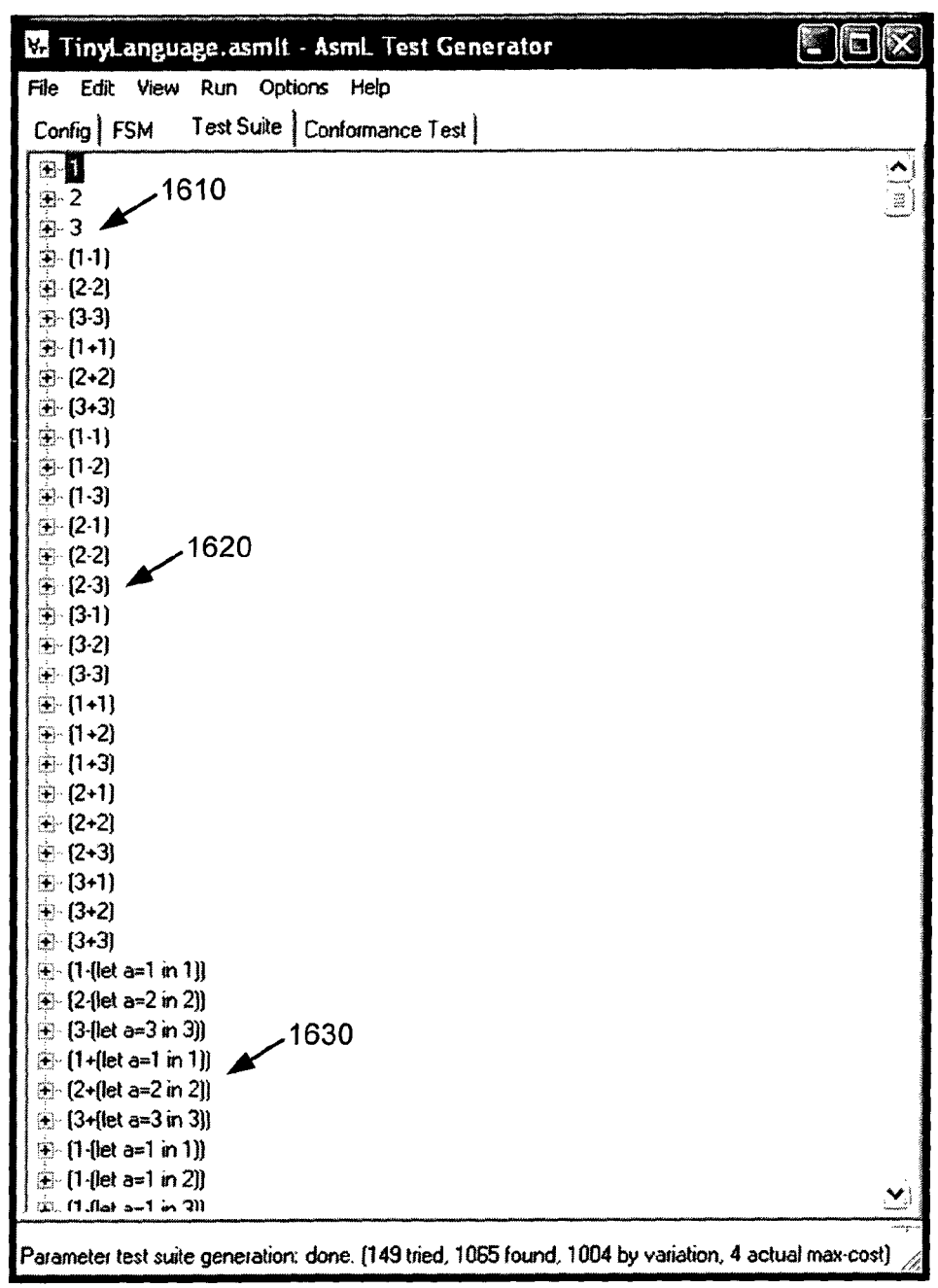
FIG. 16 is a diagram of a graphical user interface element indicating a data domain produced for the data type Exp of FIG. 9 according to the user input of FIGS. 12 through 15.

Once the domain configuration information 430 is entered as shown using the exemplary user interfaces of FIGS. 10 through 15 the information may be provided to the domain configuration manager 410 which can then produce the data domains 440. An exemplary data domain for the data type Exp produced according to the data configuration information provided as described with reference to FIGS. 10 through 15 may be as shown in FIG. 16. Depending on the order in which the inherited from list 1420 is added (e.g., the order of Const, Bin, Let and Var) the data domains may be listed as domain for Const sub-types 1610, Bin sub-types 1620 and Let sub-types 1630 and so on. Other data domains may be listed in a similar manner.

Alternatives

Having described and illustrated the principles of our invention with reference to the illustrated embodiments, it will be recognized that the illustrated embodiments can be modified in arrangement and detail without departing from such principles. It should be understood that the programs, processes, or methods described herein are not related or limited to any particular type of computer apparatus. Various types of general purpose or specialized computer apparatus may be used with or perform operations in accordance with the teachings described herein. Actions described herein can be achieved by computer-readable media comprising computer-executable instructions for performing such actions. Elements of the illustrated embodiment shown in software may be implemented in hardware and vice versa. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A computer implemented method for producing data domain information structures and associated values, sets of values and/or tuples for testing or validation of a computer program, the method comprising:
    generating a reflection of the computer program comprising constructs, wherein the computer program constructs comprise one or more first data structure elements and a second data structure element, the one or more first data structure elements and the second data structure element comprising data types, data fields, functions, methods and/or parameters of the computer program;
    annotating the one or more first data structure elements and the second data structure element with information related to the purpose of domain configuration;
    configuring one or more first data domains corresponding to the one or more first data structure elements and a second data domain corresponding to the second data structure element, the configuring comprising generating one or more structural language expressions for representing/evaluating the one or more first data structure elements and the second data structure element and for defining relationships among the one or more first data structure elements and the second data structure element in terms of type/method inheritance and types;
    wherein generating the one or more structural language expressions includes generating at least one of:
        if the second data structure element is a first data type comprising a plurality a sub-types, at least one structural language expression denoting a union of one or more of the one or more first data domains corresponding to the one or more first data structure elements that are sub-types of the first data type;
        if the second data structure element is a sub-type, data field or parameter of a second data type, at least one structural language expression indicating that the second data domain can be inherited from one of the one or more first data structure elements that are of the second data type;
        if the second data structure element is a method, at least one structural language expression denoting inheritance relationships between types and subtypes of the second data structure element and types and subtypes of the one or more first data structure elements wherein the one or more first data structure elements represent parameters of another method described in the one or more first data domains; and
        at least one structural language expression comprising a Cartesian product as an invocable method to cross-relate the second data structure element with one or more data domains corresponding to the one or more first data structure elements; and
    compiling the annotated one or more first data structure elements and the second data structure element to produce values, sets of values and/or tuples of the one or more first data domains and the second data domain; and
    testing or validating the computer program using at least one of the values, sets of values and/or tuples from the one or more first data domains and the second data domain.

2. The method of claim 1, wherein the one or more structural language expressions comprise methods and functions defined within the code of the computer program, which are exposed via the reflection of the computer program.

3. The method of claim 1, wherein the one or more structural language expressions comprise one or more predicates such that the second data domain comprises values or tuples that meet the one or more predicate.

4. The method of claim 1, wherein the one or more structural language expressions are provided as Abstract State Machine Language (ASML) expressions.

5. One or more computer-readable media storing computer-executable instructions for performing a method for producing data domain information structures and associated values, sets of values and/or tuples for testing or validation of a computer program, the method comprising:
    generating a reflection of the computer program comprising constructs, wherein the computer program constructs comprise one or more first data structure elements and a second data structure element, the one or more first data structure elements and the second data structure element comprising data types, data fields, functions, methods and/or parameters of the computer program;
    annotating the one or more first data structure elements and the second data structure element with information related to the purpose of domain configuration;
    configuring one or more first data domains corresponding to the one or more first data structure elements and a second data domain corresponding to the second data structure element, the configuring comprising generating one or more structural language expressions for representing/evaluating the one or more first data structure elements and the second data structure element and for defining relationships among the one or more first data structure elements and the second data structure element in terms of type/method inheritance and types;
    wherein generating the one or more structural language expressions includes generating at least one of:
        if the second data structure element is a first data type comprising a plurality a sub-types, at least one structural language expression denoting a union of one or more of the one or more first data domains corresponding to the one or more first data structure elements that are sub-types of the first data type;

if the second data structure element is a sub-type, data field or parameter of a second data type, at least one structural language expression indicating that the second data domain can be inherited from one of the one or more first data structure elements that are of the second data type;

if the second data structure element is a method, at least one structural language expression denoting inheritance relationships between types and subtypes of the second data structure element and types and subtypes of the one or more first data structure elements wherein the one or more first data structure elements represent parameters of another method described in the one or more first data domains; and at least one structural language expression comprising a Cartesian product as an invocable method to cross-relate the second data structure element with one or more data domains corresponding to the one or more first data structure elements; and compiling the annotated one or more first data structure elements and the second data structure element to produce values, sets of values and/or tuples of the one or more first data domains and the second data domain; and testing or validating the computer program using at least one of the values, sets of values and/or tuples from the one or more first data domains and the second data domain.

6. The one or more computer-readable media of claim 5, wherein the one or more structural language expressions comprise methods and functions defined within the computer program and exposed via the reflection of the computer program.

7. The one or more computer-readable media of claim 5, wherein the one or more structural language expressions comprise one or more predicates such that the second data domain comprises values or tuples that meet the one or more predicates.

* * * * *